United States Patent
Mariyani et al.

(10) Patent No.: US 11,991,783 B2
(45) Date of Patent: May 21, 2024

(54) DATA NETWORK NAME (DNN) MODIFICATION FOR A WIRELESS USER EQUIPMENT (UE) IN WIRELESS COMMUNICATION NETWORKS

(71) Applicant: T-Mobile Innovations LLC, Overland Park, KS (US)

(72) Inventors: Anil Kumar Mariyani, Ashburn, VA (US); Rajil Malhotra, Olathe, KS (US); Chris Alan Jensen, Snoqualmie, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 465 days.

(21) Appl. No.: 17/403,201

(22) Filed: Aug. 16, 2021

(65) Prior Publication Data
US 2023/0048870 A1 Feb. 16, 2023

(51) Int. Cl.
| | | |
|---|---|---|
| H04W 84/10 | (2009.01) | |
| H04W 4/24 | (2018.01) | |
| H04W 4/50 | (2018.01) | |
| H04W 8/18 | (2009.01) | |
| H04W 8/20 | (2009.01) | |
| H04W 8/22 | (2009.01) | |
| H04W 76/10 | (2018.01) | |

(Continued)

(52) U.S. Cl.
CPC .............. *H04W 8/22* (2013.01); *H04W 4/24* (2013.01); *H04W 4/50* (2018.02); *H04W 8/20* (2013.01); *H04W 76/10* (2018.02)

(58) Field of Classification Search
CPC ........... H04W 8/22; H04W 4/24; H04W 4/50; H04W 8/20; H04W 76/10; H04W 76/12; H04W 76/11; H04W 84/105; H04W 8/18
See application file for complete search history.

(56) References Cited

U.S. PATENT DOCUMENTS 10,142,994 B2  11/2018  Lee et al.
11,284,320 B2 *  3/2022  Kawasaki ......... H04W 28/0205
(Continued)

OTHER PUBLICATIONS

"3rd Generation Partnership Project; Technical Specification Group Services and System Aspects; System architecture for the 5G System (5GS); Stage 2 (Release 17)"; 3GPP TS 23.501; Jun. 2021; pp. 1-526; V17.1.0; 3GPP; Sophia Antipolis, France.
(Continued)

*Primary Examiner* — Joseph E Dean, Jr.

(57) ABSTRACT

A wireless communication network serves a wireless data service to a wireless User Equipment (UE). In the wireless communication network, a network controller receives a service request from a wireless UE and transfers a UE context request to a Unified Data Management (UDM). The UDM retrieves a subscriber profile for the wireless UE. The UDM identifies a wireless service type for the wireless UE and identifies a set of virtual Data Network Names (vDNNs) in the subscriber profile. The UDM selects one of the vDNNs for the wireless UE based on the wireless service type of the wireless UE. The UDM indicates the selected one of the vDNNs to the network controller. The network controller overrides provisioned DNN values using the selected one of the vDNNs. The network controller establishes a wireless data session for the wireless UE based on the selected one of the vDNNs.

20 Claims, 7 Drawing Sheets

(51) Int. Cl.
*H04W 76/11* (2018.01)
*H04W 76/12* (2018.01)

(56) References Cited

U.S. PATENT DOCUMENTS

| | | | |
|---|---|---|---|
| 11,700,516 B2* | 7/2023 | Mariyani | H04W 8/02 455/418 |
| 2019/0342851 A1 | 11/2019 | Shan et al. | |
| 2020/0196169 A1 | 6/2020 | Dao et al. | |
| 2020/0351980 A1 | 11/2020 | Talebi Fard et al. | |
| 2021/0227625 A1* | 7/2021 | Wang | H04W 76/11 |

OTHER PUBLICATIONS

Nokia, et al.; "Mega CR to clean up"; 3GPP TSG-SA2 Meeting #142E; Nov. 16, 2020; 75 pages; S2-2009347; 3GPP; Sophia Antipolis, France.

* cited by examiner

DATA NETWORK NAME (DNN) MODIFICATION FOR A WIRELESS USER EQUIPMENT (UE) IN WIRELESS COMMUNICATION NETWORKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network functions in the network cores. The network cores execute the network functions to provide wireless data services to the wireless user devices over the RANs. Exemplary network functions include Access and Mobility Management Functions (AMF), Unified Data Management (UDM), and Unified Data Repository (UDR).

A wireless user device is provisioned with a Data Network Name (DNN). The DNN corresponds to service attributes like Quality-of-Service (QoS) and billing. Different types of wireless user devices may be provisioned with the same DNN. In a wireless network core, the AMF interacts with the UDM to provide wireless data services for the wireless user device. The UDM retrieves user context that comprises the DNN for the wireless user device from the UDR. The UDM transfers the user context to the AMF. The AMF uses the DNN in the user context to serve the wireless user device a wireless data service. The QoS and billing rate of the wireless data service are controlled by the provisioned DNN. The provisioned DNN of the wireless user device is rigid and difficult to update. Unfortunately, the wireless network core does not effectively update the provisioned DNN of wireless user devices. Moreover, the wireless network core does not efficiently provide different QoS for different wireless user devices that have the same DNN.

TECHNICAL OVERVIEW

A wireless communication network serves a wireless data service to a wireless User Equipment (UE). In the wireless communication network, a network controller receives a service request from the wireless UE. The network controller transfers a UE context request to a Unified Data Management (UDM). The UDM receives the UE context request. The UDM retrieves a subscriber profile for the wireless UE. The UDM identifies a wireless service type for the wireless UE. The UDM identifies a set of virtual Data Network Names (vDNNs) in the subscriber profile. The UDM selects one of the vDNNs for the wireless UE based on the wireless service type of the wireless UE. The UDM indicates the selected one of the vDNNs to the network controller. The network controller receives the indication. The network controller overrides provisioned DNN values using the selected one of the vDNNs. The network controller establishes a wireless data session for the wireless UE based on the selected one of the vDNNs.

DETAILED DESCRIPTION

Figure 1:
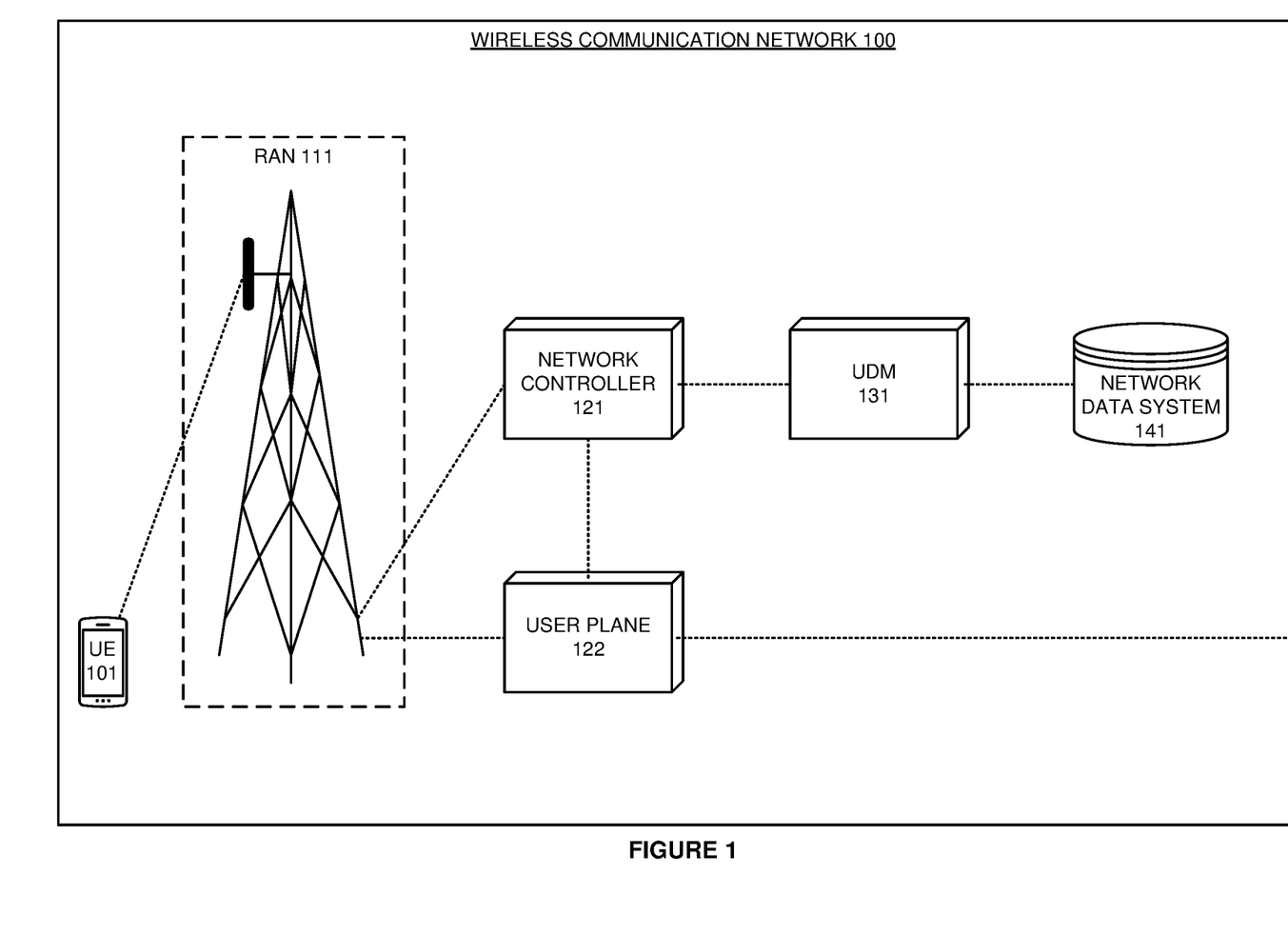
FIG. 1 illustrates a wireless communication network to serve a wireless User Equipment (UE) a wireless data service.

FIG. 1 illustrates wireless communication network 100 to serve wireless User Equipment (UE) 101 a wireless data service. Wireless communication network 100 delivers services to wireless user devices like internet-access, voice calling, media-streaming, machine communications, or some other wireless communications product. Wireless communication network 100 comprises wireless UE 101, Radio Access Network (RAN) 111, network controller 121, user plane 122, Unified Data Management (UDM) 131, and network data system 141.

Various examples of network operation and configuration are described herein. In some examples, network controller 121 receives a service request from a wireless UE over RAN 111. Network controller 121 transfers a UE context request for wireless UE 101 to UDM 131. UDM 131 retrieves a subscriber profile for wireless UE 101 from network data system 141. UDM 131 identifies a wireless service type for wireless UE 101. For example, UDM 131 may identify a Mobile Virtual Network Operator (MVNO) or Private Enterprise Network for wireless UE 101. In response to identifying the wireless service type for wireless UE 101, UDM 131 identifies a set of virtual Data Network Names (vDNNs) in the subscriber profile. UDM 131 selects one of the vDNNs for the wireless UE based on the wireless service type of wireless UE 101. UDM 131 indicates the selected one of the vDNNs to network controller 121. Network controller 121 overrides provisioned DNN values for wireless UE 101 using the selected one of the vDNNs. For example, network controller 121 may override a provisioned DNN for user plane selection with the vDNN to provide a different QoS to UE 101 than would be given by the provisioned DNN. Network controller 121 establishes a wireless data session for wireless UE 101 over RAN 111 and user plane 122 based on the selected one of the vDNNs. Advantageously, UDM 131 effectively overrides the provisioned DNN for wireless UE 101 with a vDNN. Moreover, the network controller 121 efficiently establishes a wireless data session for wireless UE 101 based on the vDNN.

Wireless UE 101 and RAN 111 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or another type of wireless networking protocol. The wireless technologies use electromagnetic frequencies in the low-band, mid-band, high-band, or some other portion of the electromagnetic spectrum. RAN 111, network controller 121, user plane 122, UDM 131, and network data system 141 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

Wireless UE 101 comprises a computer, phone, vehicle, sensor, robot, or another type of data appliance with wireless and/or wireline communication circuitry. RAN 111 is depicted as a tower but RAN 111 may use another mounting structure or no mounting structures at all. RAN 111 comprises a Fifth Generation (5G) RAN, LTE RAN, gNodeB, eNodeB, NB-IoT access node, LP-WAN base stations, wireless relay, WIFI hotspot, bluetooth access node, and/or another type of wireless network transceiver. Wireless UE 101 and RAN 111 comprise antennas, amplifiers, filters, modulators, analog/digital interfaces, microprocessors, software, memories, transceivers, bus circuitry, and the like. Network controller 121 comprises network functions like Access and Mobility Management function (AMF), Session Management Function (SMF), and the like. User plane 122 comprises network functions like User Plane Function (UPF) and the like. Network data system 141 comprises network elements like Uniform Data Registry (UDR), Unstructured Data Storage Function (UDSF), and the like. UE 101, RAN 111, network controller 121, user plane 122, UDM 131, and network data system 141 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
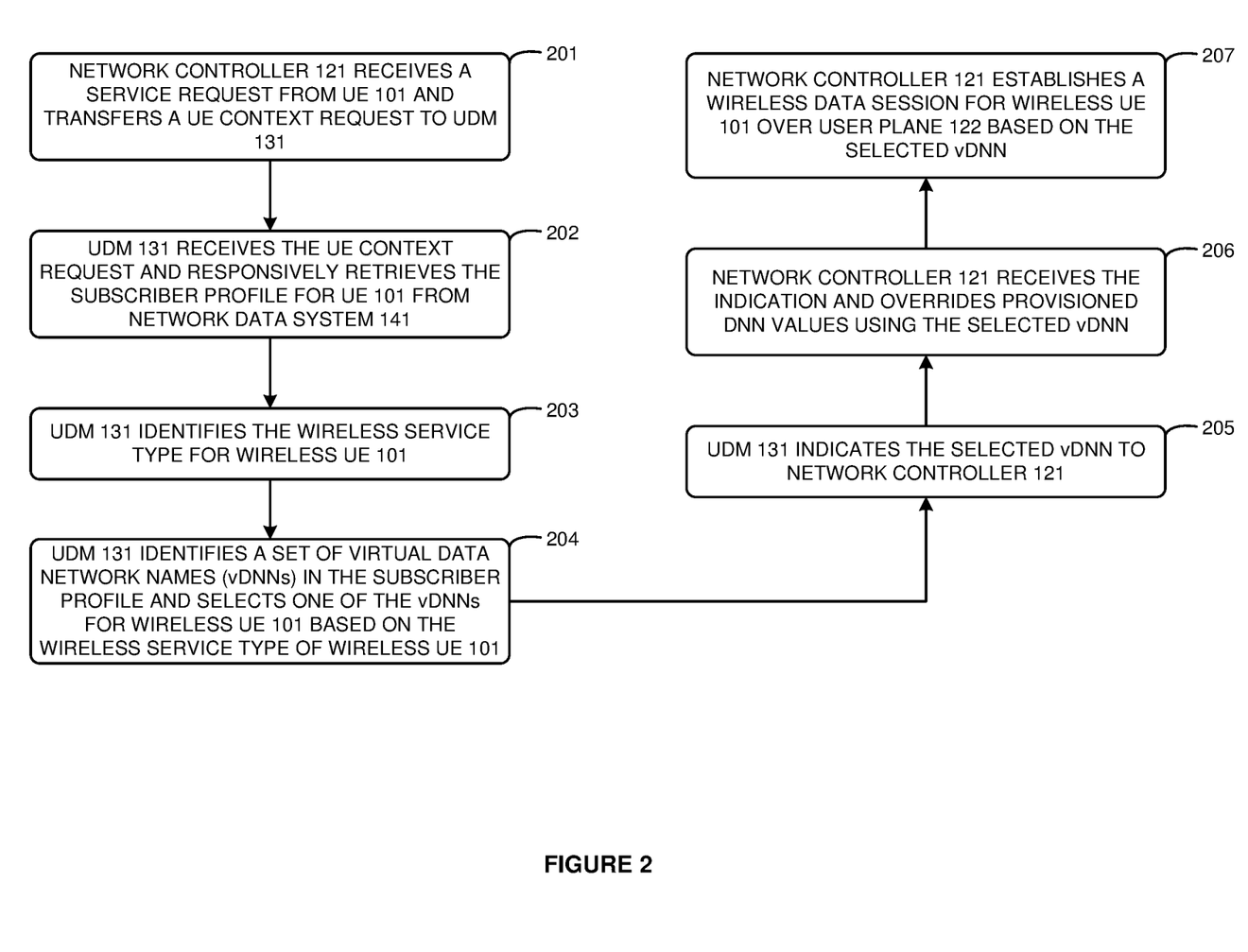
FIG. 2 illustrates an exemplary operation of the wireless communication network to serve the wireless UE the wireless data service.

FIG. 2 illustrates an exemplary operation of wireless communication network 100 to serve wireless UE 101 a wireless data service. The operation may vary in other examples. Network controller 121 receives a service request from UE 101 and transfers a UE context request to UDM 131 (201). UDM 131 receives the UE context request and responsively retrieves the subscriber profile for UE 101 from network data system 141 (202). UDM 131 identifies the wireless service type for wireless UE 101 (203). UDM 131 identifies a set of virtual Data Network Names (vDNNs) in the subscriber profile and selects one of the vDNNs for wireless UE 101 based on the wireless service type of wireless UE 101 (204). UDM 131 indicates the selected vDNN to network controller 121 (205). Network controller 121 receives the indication and overrides provisioned DNN values using the selected vDNN (206). Network controller 121 establishes a wireless data session for wireless UE 101 over user plane 122 based on the selected vDNN (207).

Figure 3:
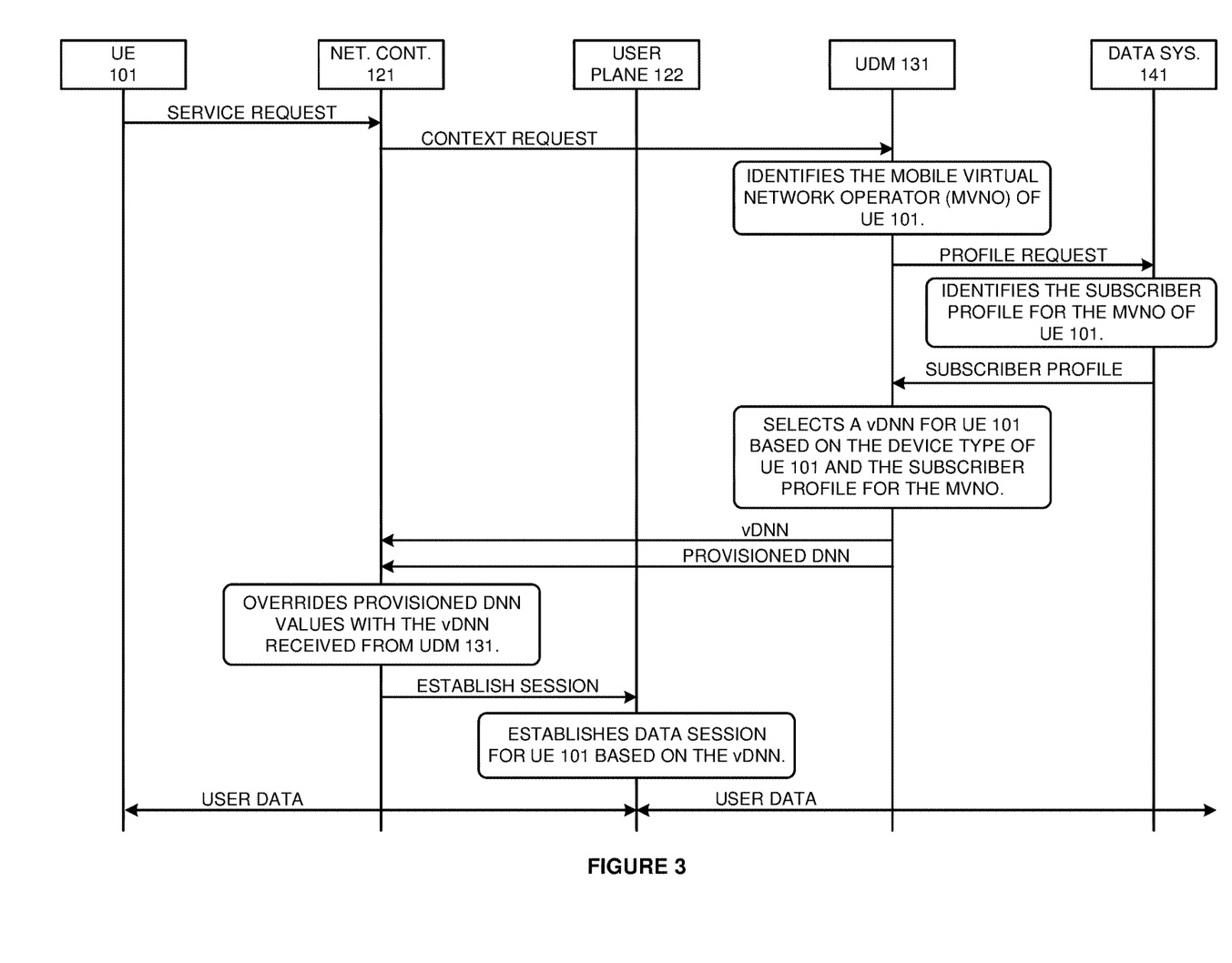
FIG. 3 illustrates another exemplary operation of the wireless communication network to serve the wireless UE the wireless data service.

FIG. 3 illustrates an exemplary operation of wireless communication network 100 to serve wireless UE 101 a wireless data service. The operation may differ in other examples. UE 101 wirelessly attaches to network controller (NET. CONT.) 121 over RAN 111. UE 101 transfers a service request to network controller 121 over RAN 111. Network controller 121 responsively transfers a context request to UDM 131. The context request requests service attributes for UE 101 to establish a data session for UE 101. UDM 131 receives the context request and responsively identifies the Mobile Virtual Network Operator (MVNO) of UE 101. UDM 131 queries network data system (DATA SYS.) 141 for the subscriber profile for the MVNO of UE 101. Network data system 141 stores multiple subscriber profiles for different MVNOs and identifies the requested subscriber profile for the MVNO of UE 101. Network data system 141 transfers the subscriber profile for the MVNO of UE 401 to UDM 131.

UDM 131 selects a vDNN for UE 101 based on the device type of UE 101 and the subscriber profile for the MVNO. The vDNN comprises service attributes like QoS level and allowed PDU session types for UE 101. For example, the subscriber profile may comprise a set of vDNNs that correspond to device types and UDM 131 may select the vDNN for the device type of UE 101. UDM 131 transfers the selected vDNN to network controller 121. UDM 131 also transfers the provisioned DNN to network controller 121. Network controller 121 receives the vDNN and the provisioned DNN. Due to the presence of the vDNN, network controller 121 overrides provisioned DNN values using the vDNN. For example, network controller 121 may map the values in the provisioned DNN with the values in the vDNN and override values in the provisioned DNN that map to values in the vDNN. Network controller 121 selects user plane 122 based on the vDNN. Network controller 121 directs user plane 122 to establish the data session for UE 101 based on the vDNN. User plane 122 establishes the data session for UE 101 based on the vDNN. UE 101 exchanges user data with user plane 122 over RAN 111. User plane 122 exchanges user data with external data networks.

Figure 4:
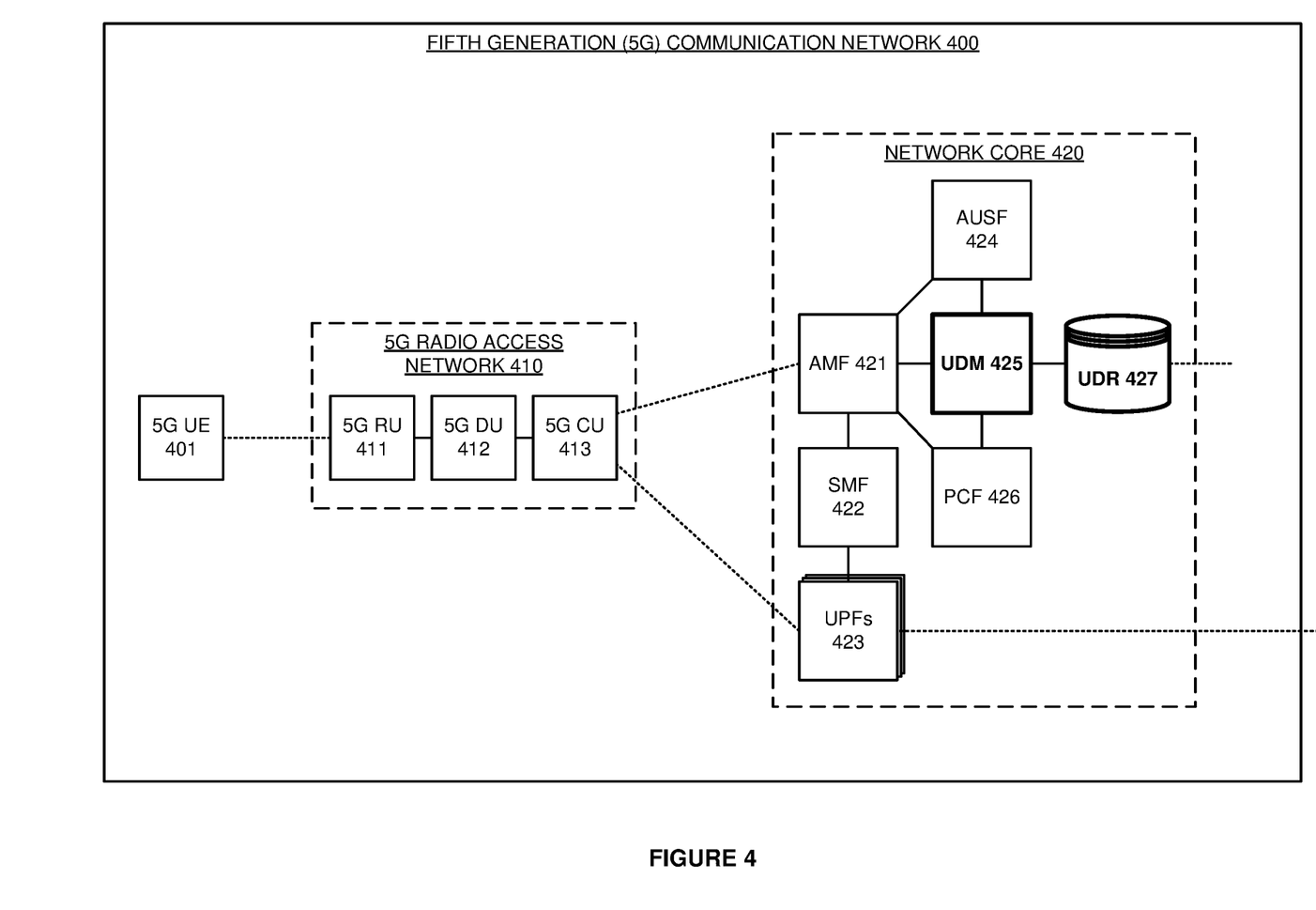
FIG. 4 illustrates a Fifth Generation (5G) communication network to serve a wireless 5G UE a wireless data service.

FIG. 4 illustrates Fifth Generation (5G) communication network 400 to serve wireless UE 401 a wireless data service. 5G communication network 400 comprises an example of wireless communication network 100, although network 100 may differ. 5G communication network 400 comprises 5G UE 401, 5G RAN 410, and 5G network core 420. 5G RAN 410 comprises 5G Radio Unit (RU) 411, 5G Distributed Unit (DU) 412, and 5G Centralized Unit (CU) 413. 5G network core 420 comprises Access and Mobility Management Function (AMF) 421, Session Management Function (SMF) 422, User Plane Functions (UPFs) 423, Authentication Server Function (AUSF) 424, Uniform Data Management (UDM) 425, Policy Control Function (PCF) 426, and Uniform Data Registry (UDR) 427. Other network functions, network elements, and regions are typically present in network core 420 but are omitted for clarity.

UDR 427 receives and stores Slice Dependent Subscriber Profiles (SDSPs) from a network operator. The operator may load the SDSPs into UDR 427. The SDSPs correspond to Mobile Virtual Network Operators (MVNOs), private enterprise networks, private WiFi networks, and/or other types of service providers that utilize the network infrastructure of 5G communication network 400. For example, a first SDSP may be for an MVNO and a second SDSP may be for a private enterprise network. The SDSPs comprise virtual Data Network Names (vDNNs). A vDNN indicates a Quality-of-Service, a billing rate, a network address, and/or other service attributes. The vDNNs correspond to device types. For example, a first vDNN may be for smartphones and a second vDNN may be for a smart-vehicles. In some examples, the vDNNs may correspond to service types like Guaranteed Bit Rate (GBR) service, low-latency service, and the like.

UE 401 wirelessly attaches to RU 411. UE 401 transfers attachment signaling to CU 413 over RU 411 and DU 412. CU 413 establishes an RRC connection with UE 401. CU 413 transfers a registration request for UE 401 to AMF 421. The registration request indicates a device type for UE 401 and the network type (e.g., MVNO) of UE 401. For example, the device type of UE 401 may comprise a smartphone. AMF 421 selects AUSF 424 and transfers an authentication request for UE 401 to AUSF 424. AUSF 424 interacts with UDM 425 to authenticate UE 401. AUSF 424 requests authentication keys for UE 401 from UDM 425. UDM 425 transfers authentication keys for UE 401 to AUSF 424. AUSF 424 uses the authentication keys and a random number to generate an expected result for UE 401. AUSF 424 transfers the random number and the expected result for UE 401 to AMF 421. AMF 421 forwards the random number for UE 401 to over RAN 410. UE 401 hashes the random number with its authentication key to generate the same expected result. UE 401 transfers the expected result to AMF 421 over RAN 410. AMF 421 matches the two expected results to authenticate the identity of UE 401.

Responsive to the authentication, AMF 421 requests UE context for UE 401 from UDM 425. AMF 421 indicates the device type and the network type of UE 401 to UDM 425. For example, AMF 421 may indicate that UE 401 is a vehicle and the private enterprise network ID used by UE 401. In some examples, UDM 425 instead determines the device type and network type for UE 401 based on the subscriber profile for UE 401. In response to the context request, UDM 425 retrieves the UE context for UE 401 from UDR 427. The UE context indicates provisioned service attributes for UE 401 like the provisioned DNN, QoS value, PDU session type and the like. UDM 425 requests the SDSP for the network type of UE 401 from UDR 427. For example, UDM 425 may identify the MVNO for UE 401 and responsively retrieve the SDSP for that MVNO from UDR 427. In response to the request, UDR 427 identifies the requested SDSP and transfers the SDSP to UDM 425.

UDM 425 selects a vDNN in the SDSP based on the device type of UE 401. The SDSP may comprise multiple vDNNs for different device types and/or service types. For example, UDM 425 may host a data structure and that correlates the vDNNs to device types and responsively select the vDNN for UE 401. In some examples, UDM 425 may select multiple vDNNs for UE 401. Typically, UDM 425 will select multiple vDNNs for UE 401 when UE 401 has network slicing capability. UDM 425 transfers the selected vDNN, the provisioned DNN, and the UE context to AMF 421.

AMF 421 receives selected vDNN, the provisioned DNN, and the UE context to AMF 421 for UE 401. Due to the presence of the vDNN, AMF 421 overrides the provisioned DNN using the vDNN for SMF and/or UPF selection. In some examples, AMF 421 may use the provisioned DNN for other services for UE 401 besides SMF and/or UPF selection. For example, the provisioned DNN may dictate PCF selection for UE 401 and AMF 421 may use the provisioned DNN to select a PCF and use the vDNN to select an SMF and/or UPF. The provisioned DNN stored on UE 401 remains unchanged by the vDNN override performed by AMF 421. AMF 421 selects PCF 426 and retrieves network policies for UE 401 from PCF 426. AMF 421 selects SMF 422 to serve UE 401 based on the vDNN and the network policies. AMF 421 directs SMF 422 to establish a Protocol Data Unit (PDU) session for UE 401 based on the vDNN. AMF 421 transfers the UE context and vDNN to SMF 422.

SMF 422 uses the vDNN to select a UPF from UPFs 423 to establish the PDU session for UE 401. For example, SMF 422 may identify a UPF that has the connectivity and QoS level dictated by the vDNN and responsively select that UPF. SMF 422 directs the selected one of UPFs 423 to establish the PDU session for UE 401. SMF 422 generates and transfers session context that indicates the selected one of UPFs 423 to AMF 421. AMF 421 transfers the session context to CU 413. CU 413 transfers the session context to UE 401 over DU 412 and RU 411. UE 401 uses the session context to initiate the PDU session with the selected one of UPFs 423. UE 401 wirelessly exchanges user data with the selected one of UPFs 423 over RAN 410. The selected one of UPFs 423 exchanges the user data with external systems.

Figure 5:
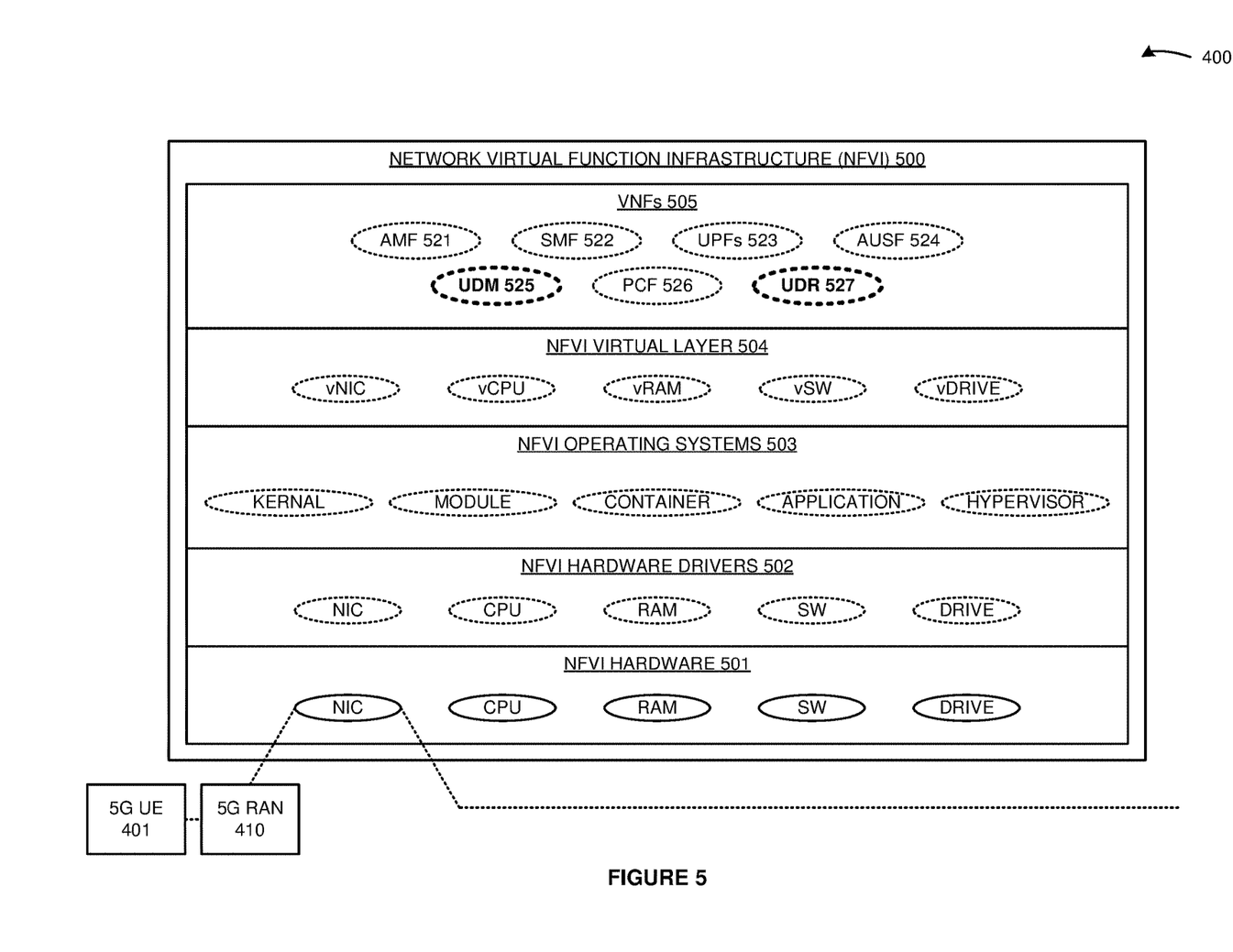
FIG. 5 illustrates a Network Function Virtualization Infrastructure (NFVI) in the 5G communication network.

FIG. 5 illustrates Network Function Virtualization Infrastructure (NFVI) 500 in 5G communications network 400. NFVI 500 comprises an example of network controller 121, UDM 131, and network data system 141, although network controller 121, UDM 131, and network data system 141 may vary from this example. NFVI 500 comprises NFVI hardware 501, NFVI hardware drivers 502, NFVI operating systems 503, NFVI virtual layer 504, and NFVI Virtual Network Functions (VNFs) 505. NFVI hardware 501 comprises Network Interface Cards (NICs), CPU, RAM, Flash/Disk Drives (DRIVE), and Data Switches (SW). NFVI hardware drivers 502 comprise software that is resident in the NIC, CPU, RAM, DRIVE, and SW. NFVI operating systems 503 comprise kernels, modules, applications, containers, hypervisors, and the like. NFVI virtual layer 504 comprises vNIC, vCPU, vRAM, vDRIVE, and vSW. NFVI VNFs 505 comprise AMF 521, SMF 522, UPFs 523, AUSF 524, UDM 525, PCF 526, and UDR 527. Additional VNFs and network elements like Network Slice Selection Function (NSSF), Network Exposure Function (NEF), and Unstructured Data Storage Function (UDSF) are typically present but are omitted for clarity. NFVI 500 may be located at a single site or be distributed across multiple geographic locations. The NIC in NFVI hardware 501 is coupled to 5G RAN 410 and to external systems. NFVI hardware 501 executes NFVI hardware drivers 502, NFVI operating systems 503, NFVI virtual layer 504, and NFVI VNFs 505 to form AMF 421, SMF 422, UPFs 423, AUSF 424, UDM 425, PCF 426, and UDR 427.

Figure 6:
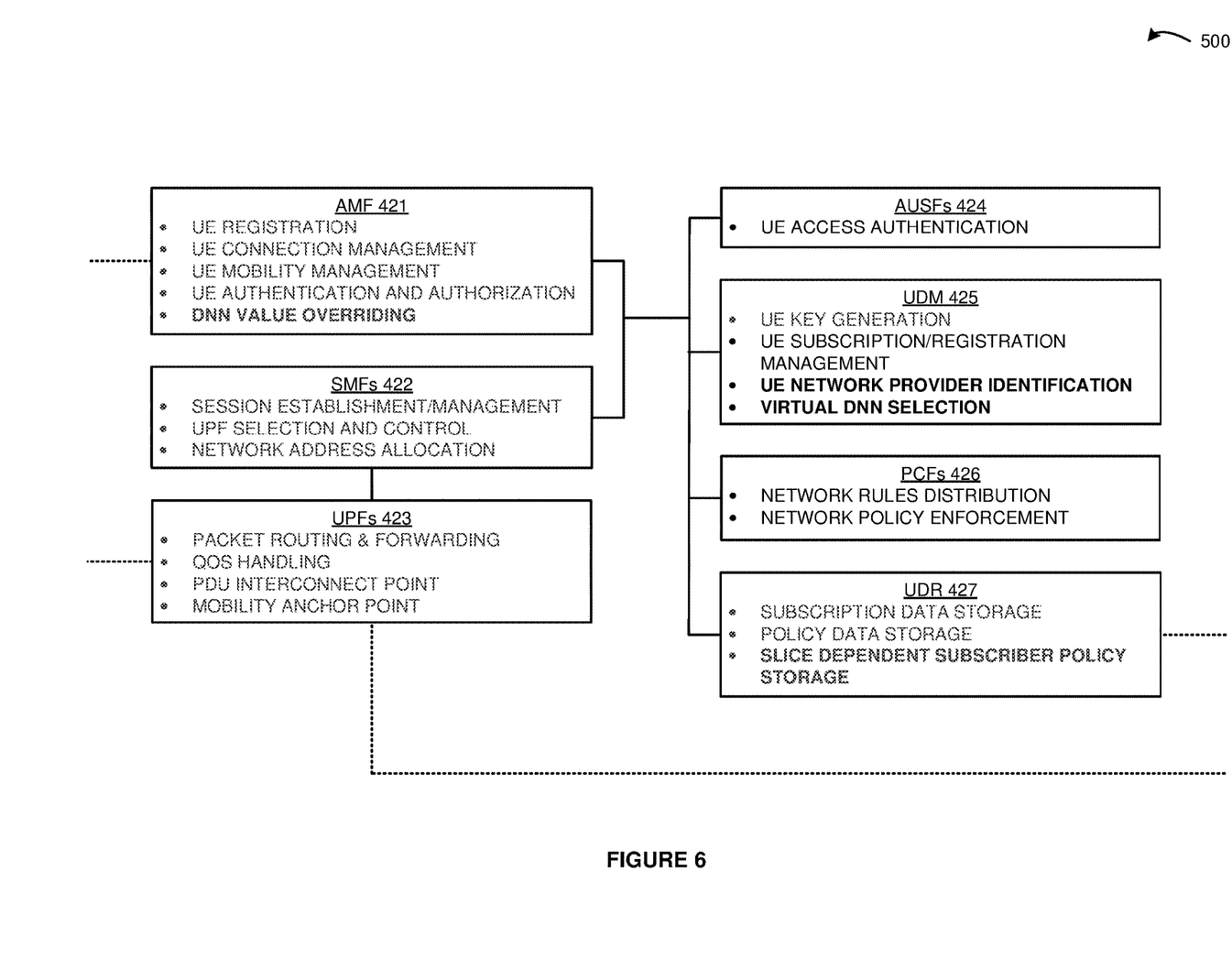
FIG. 6 further illustrates the NFVI in the 5G communication network.

FIG. 6 further illustrates NFVI 500 in 5G communication network 400. AMF 421 performs UE registration and connection, UE connection/mobility management, UE authentication and authorization, and DNN value overriding. SMF 422 performs session establishment and management, UPF selection and control, and network address allocation. UPFs 423 perform packet routing & forwarding, QoS handling, PDU interconnection, and mobility anchoring. AUSF 424 performs UE access authentication. UDM 425 performs UE, key generation, UE subscription and registration management, UE network provider identification, and DNN selection. PCF 426 performs network rules management and distribution and network policy enforcement. UDR 427 performs subscription data, storage, policy data storage, and Slice Dependent Subscriber Profile (SDSP) storage.

In this example, UDM 425 selects a vDNN for UE 401 based on the device type and private enterprise network of UE 401, however the operation may differ in other examples. In operation, UDR 427 receives and stores SDSPs from a network operator. The SDSPs correspond to different MVNOs and private enterprise networks. Each of the SDSPs comprises multiple vDNNs that each indicate a QoS, a billing rate, and a network address. Each of the vDNNs correspond to a different device type.

AMF 421 receives a registration request for UE 401 from RAN 410. AMF 421 directs AUSF 424 to authenticate UE 401. AUSF 424 interacts with UDM 425 to authenticate UE 401. Responsive to the authentication, AMF 421 requests UE context for UE 401 from UDM 425. UDM 425 receives the request and responsively retrieves the subscriber profile for UE 401 from UDR 427. UDM 425 generates UE context for UE 401 based on the subscriber profile. UDM 425 determines the device type and the private enterprise network for UE 401. For example, the subscriber profile for UE 01 may indicate a device type and a private enterprise network. UDM 425 requests the SDSP for the private enterprise network of UE 401 from UDR 427. UDR 427 identifies the requested SDSP and transfers the SDSP to UDM 425. UDM 425 selects the smartphone vDNN in the SDSP based on the device type of UE 401. UDM 425 transfers the selected vDNN, the provisioned DNN, and the UE context to AMF 421.

AMF 421 receives selected vDNN, the provisioned DNN, and the UE context to AMF 421 for UE 401. Due to the presence of the vDNN, AMF 421 overrides the provisioned DNN with the DNN values from the vDNN for SMF and/or UPF selection. AMF 421 selects PCF 426 and retrieves network policies for UE 401 from PCF 426. AMF 421 selects SMF 422 to serve UE 401 based on the vDNN and the network policies. AMF directs SMF 422 to establish a PDU session for UE 401 based on the vDNN and transfers the UE context including the vDNN to SMF 422.

SMF 422 uses the vDNN to select a UPF from UPFs 423 that has the connectivity and QoS level dictated by the vDNN. SMF 422 directs the selected one of UPFs 423 to establish the PDU session for UE 401. SMF 422 generates and transfers session context that indicates the selected one of UPFs 423 to AMF 421. AMF 421 transfers the session context to CU 413. CU 413 transfers the session context to UE 401 over DU 412 and RU 411. UE 401 uses the session context to initiate the PDU session with the selected one of UPFs 423. UE 401 wirelessly exchanges user data with the selected one of UPFs 423 over RAN 410. The selected one of UPFs 423 exchanges the user data for external systems. SMF 422 uses the billing rate indicated by the vDNN to track the data usage of UE 401.

Figure 7:
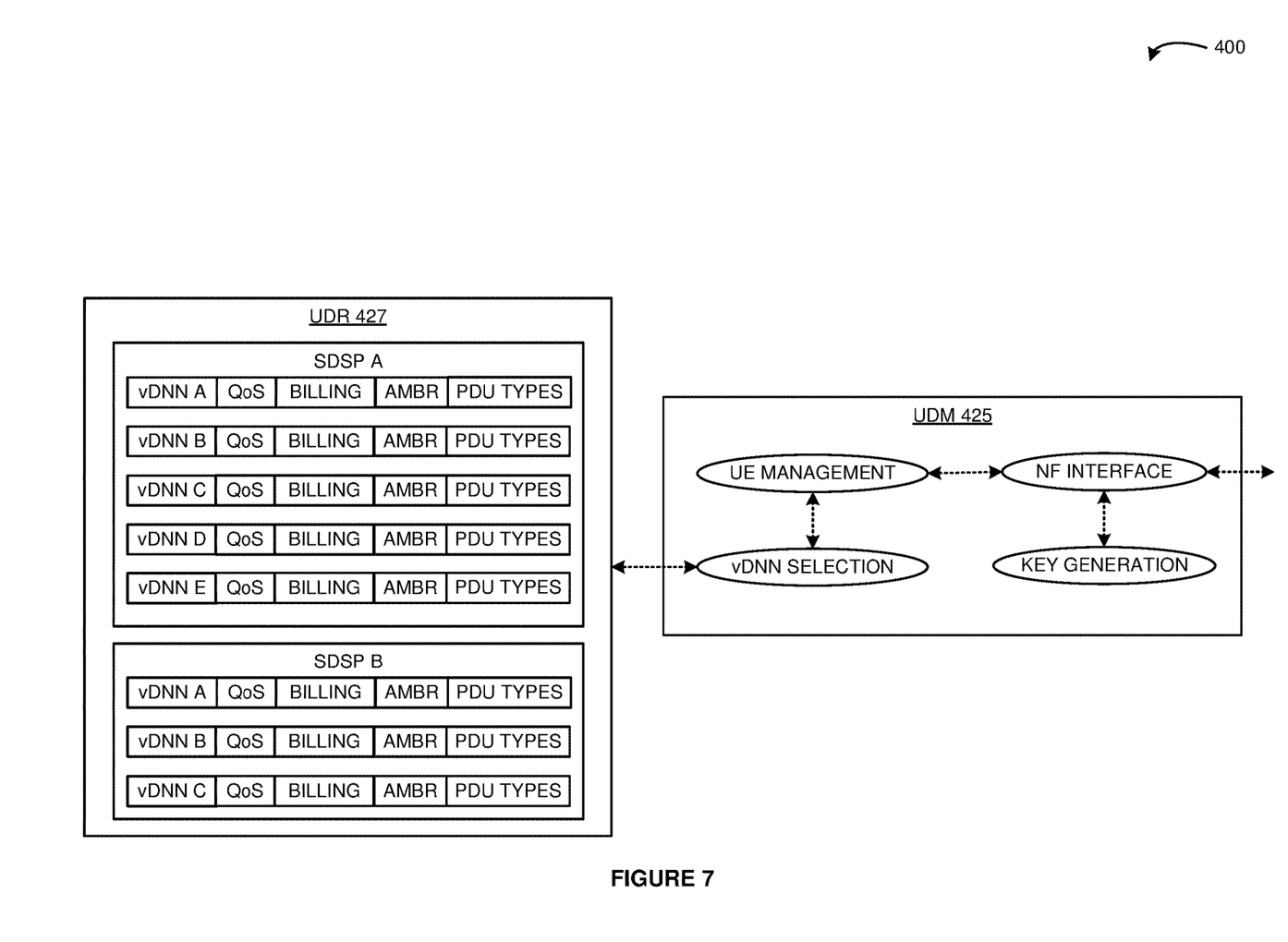
FIG. 7 illustrates a Unified Data Management (UDM) and a Unified Data Registry (UDR) in the 5G communication network.

FIG. 7 illustrates UDM 425 and UDR 427 in 5G communication network 400. UDM 425 comprises an example of UDM 131, although UDM 131 may differ. UDR 427 comprises an example of network data system 141, although network data system 141 may differ. UDR 427 stores SDSPs A and B. The SDSPs are for different MVNOs, private networks, and/or other network types that utilize the infrastructure of 5G communication network 400. For example, SDSP A may be for an MVNO while SDSP B may be for a private network. SDSP A comprises vDNNs A-E and SDSP B comprises vDNNs A-C. The vDNNs indicate a QoS, Aggregate Maximum Bit Rate (AMBR), billing rate (BILLING), and PDU types. In some examples, the vDNNs may comprise additional service attributes and/or other service attributes. Each of the vDNNs corresponds to a device type. For example, vDNN A may be for autonomous drones and vDNN B may be for smartphones. UDM 425 comprises Network Function (NF) interface components that interact with other network functions to exchange network data like UE context. UDM 425 comprises key generation components that generate secret keys to authenticate UE 401. UDM 425 comprises UE management components to retrieve UE context for users. UDM 425 comprises vDNN selection components to select a vDNN for UE 401.

The wireless data network circuitry described above comprises computer hardware and software that form special-purpose network circuitry to serve a wireless data service to a wireless UE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve the wireless data service to a wireless UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a wireless data service to a wireless User Equipment (UE), the method comprising:
  a network controller receiving a service request from the wireless UE and transferring a UE context request to a Unified Data Management (UDM);
  the UDM receiving the UE context request, retrieving a subscriber profile for the wireless UE, identifying a wireless service type for the wireless UE, identifying a set of virtual Data Network Names (vDNNs) in the subscriber profile, selecting one of the vDNNs for the wireless UE based on the wireless service type of the wireless UE, and indicating the selected one of the vDNNs to the network controller; and
  the network controller receiving the indication, overriding provisioned DNN values using the selected one of the vDNNs, and establishing a wireless data session for the wireless UE based on the selected one of the vDNNs.

2. The method of claim 1 wherein the UDM retrieving the subscriber profile for the wireless UE comprises the UDM querying a Unified Data Registry (UDR) for the subscriber profile and the UDR transferring the subscriber profile for the wireless UE to the UDM.

3. The method of claim 1 wherein the UDM identifying the wireless service type for the wireless UE and selecting the one of the vDNNs for the wireless UE based on the wireless service type of the wireless UE comprises the UDM identifying a Mobile Virtual Network Operator (MVNO) for the wireless UE and selecting the one of the vDNNs based on the MVNO of the wireless UE.

4. The method of claim 1 wherein the UDM identifying the wireless service type for the wireless UE and selecting the one of the vDNNs for the wireless UE based on the wireless service type of the wireless UE comprises the UDM identifying a Private Enterprise Network for the wireless UE and selecting the one of the vDNNs based on the Private Enterprise Network of the wireless UE.

5. The method of claim 1 further comprising the UDM identifying a device type of the wireless UE and selecting one of the vDNNs for the wireless UE based on the wireless service type of the wireless UE and the device type of the wireless UE.

6. The method of claim 1 wherein individual ones of the vDNNs comprise a Quality-of-Service (QoS) level.

7. The method of claim 1 wherein individual ones of the vDNNs comprise a billing rate.

8. The method of claim 1 wherein the network controller receiving the service request from the wireless UE and transferring the UE context request to the UDM comprises an Access and Mobility Management Function (AMF) receiving the service request from the wireless UE and transferring the UE context request to the UDM.

9. The method of claim 1 wherein the network controller receiving the indication and overriding the provisioned DNN values using the selected one of the vDNNs comprises an Access and Mobility Management Function (AMF) receiving the indication and overriding provisioned DNN values using the selected one the of the vDNNs.

10. The method of claim 1 wherein the network controller establishing the wireless data session for the wireless UE based on the selected one of the vDNNs comprises an Access and Mobility Management Function (AMF) directing a Session Management Function (SMF) to establish the wireless data session using the selected one of the vDNNs over a User Plane Function (UPF).

11. A wireless communication network configured to serve a wireless data service to a wireless User Equipment (UE), the wireless communication network comprising:
  a network controller configured to receive a service request from a wireless UE and transfer a UE context request to a Unified Data Management (UDM);
  the UDM configured to receive the UE context request, retrieve a subscriber profile for the wireless UE, identify a wireless service type for the wireless UE, identify a set of virtual Data Network Names (vDNNs) in the subscriber profile, select one of the vDNNs for the wireless UE based on the wireless service type of the wireless UE, and indicate the selected one of the vDNNs to the network controller; and
  the network controller configured to receive the indication, override provisioned DNN values using the selected one of the vDNNs, and establish a wireless data session for the wireless UE based on the selected one of the vDNNs.

12. The wireless communication network of claim 11 wherein the UDM is configured to retrieve the subscriber profile for the wireless UE comprises the UDM configured to query a Unified Data Registry (UDR) for the subscriber profile and the UDR configured to transfer the subscriber profile for the wireless UE to the UDM.

13. The wireless communication network of claim 11 wherein the UDM is configured to identify the wireless service type for the wireless UE and select the one of the vDNNs for the wireless UE based on the wireless service type of the wireless UE comprises the UDM configured to identifying a Mobile Virtual Network Operator (MVNO) for the wireless UE and select the one of the vDNNs based on the MVNO of the wireless UE.

14. The wireless communication network of claim 11 wherein the UDM is configured to identify the wireless service type for the wireless UE and select the one of the vDNNs for the wireless UE based on the wireless service type of the wireless UE comprises the UDM configured to identify a Private Enterprise Network for the wireless UE and select the one of the vDNNs based on the Private Enterprise Network of the wireless UE.

15. The wireless communication network of claim 11 further comprising the UDM configured to identify a device type of the wireless UE and select one of the vDNNs for the wireless UE based on the wireless service type of the wireless UE and the device type of the wireless UE.

16. The wireless communication network of claim 11 wherein individual ones of the vDNNs comprise a Quality-of-Service (QoS) level.

17. The wireless communication network of claim 11 wherein individual ones of the vDNNs comprise a billing rate.

18. The wireless communication network of claim 11 wherein the network controller is configured to receive the service request from the wireless UE and transfer the UE context request to the UDM comprises an Access and Mobility Management Function (AMF) configured to receive the service request from the wireless UE and transfer the UE context request to the UDM.

19. The wireless communication network of claim 11 wherein the network controller is configured to receive the indication and override the provisioned DNN values using the selected one of the vDNNs comprises an Access and Mobility Management Function (AMF) configured to receive the indication and override the provisioned DNN values using the selected on the of the vDNNs.

20. The wireless communication network of claim 11 wherein the network controller is configured to establish the wireless data session for the wireless UE based on the selected one of the vDNNs comprises an Access and Mobility Management Function (AMF) configured to direct a Session Management Function (SMF) to establish the wireless data session using the selected one of the vDNNs over a User Plane Function (UPF).

\* \* \* \* \*